United States Patent
Bezugly et al.

(10) Patent No.: US 11,830,168 B2
(45) Date of Patent: Nov. 28, 2023

(54) METHOD OF COMPRESSING IMAGE DATA FOR NETWORK TRANSPORT

(71) Applicant: Tobii AB, Danderyd (SE)

(72) Inventors: Alexey Bezugly, Danderyd (SE);
Dennis Rådell, Danderyd (SE); Ritchie Brannan, Danderyd (SE)

(73) Assignee: Tobii AB, Danderyd (SE)

( * ) Notice: Subject to any disclaimer, the term of this patent is extended or adjusted under 35 U.S.C. 154(b) by 0 days.

(21) Appl. No.: 17/704,638

(22) Filed: Mar. 25, 2022

(65) Prior Publication Data
US 2022/0318953 A1    Oct. 6, 2022

(30) Foreign Application Priority Data

Mar. 31, 2021 (SE) .................................. 2150416-2

(51) Int. Cl.
*G06K 9/46* (2006.01)
*G06T 3/40* (2006.01)
(Continued)

(52) U.S. Cl.
CPC ............ *G06T 3/4092* (2013.01); *G06F 3/013* (2013.01); *G06T 5/002* (2013.01); *G06T 5/20* (2013.01); *G09G 3/002* (2013.01)

(58) Field of Classification Search
CPC ......... G06T 3/4092; G06T 5/002; G06T 5/20; G06F 3/013; G09G 3/022
See application file for complete search history.

(56) References Cited

U.S. PATENT DOCUMENTS

2003/0198393 A1* 10/2003 Berstis ................. H04N 13/194
                                                          348/E13.071
2017/0287112 A1    10/2017 Stafford et al.
(Continued)

FOREIGN PATENT DOCUMENTS

| EP | 3343917 A1 | 7/2018 |
| WO | 2018092147 A1 | 5/2018 |
| WO | 2020006287 A1 | 1/2020 |

OTHER PUBLICATIONS

Xin Zhang et al. "Real-time foveation filtering using nonlinear Mipmap interpolation", The Visual Computer; International Journal of Computer Graphics, Apr. 9, 2010, Springer, Berlin, DE; nr. 6-8, vol. 26, p. 923-932, ISSN 1432-2315; whole document.
(Continued)

*Primary Examiner* — Abdul-Samad A Adediran
(74) *Attorney, Agent, or Firm* — Christopher Ignatius Moylan

(57) ABSTRACT

A method for improved compression and filtering of images for foveated transport applications. The improvements including calculating along at least one axis of the full-resolution image data set, the distance from the foveal point to edges of full-resolution image data set, calculating the distance from each edge of the full resolution data set to the closest point on a foveal region surrounding the foveal point, calculating the distribution of available space in the adjacent peripheral regions of the image using a compression parameter, and calculating a compression curve wherein the compression of both adjacent peripheral regions is such that neither side of the adjacent peripheral regions are compressed more than the other.

20 Claims, 4 Drawing Sheets

(51) Int. Cl.
    *G06F 3/01*     (2006.01)
    *G06T 5/00*     (2006.01)
    *G06T 5/20*     (2006.01)
    *G09G 3/00*     (2006.01)

(56)                References Cited

U.S. PATENT DOCUMENTS

2018/0096471 A1     4/2018   Wilson et al.
2018/0137602 A1     5/2018   Spitzer
2019/0026874 A1     1/2019   Jin et al.
2019/0339528 A1*   11/2019   Freeman ................ G09G 3/002

OTHER PUBLICATIONS

Extended European Search Report in the Appl.Nr. EP22165340.5, dated Jul. 26, 2022.
Swedish Search Report in the Appl.Nr. SE2150416-2, dated Dec. 7, 2021.

* cited by examiner

METHOD OF COMPRESSING IMAGE DATA FOR NETWORK TRANSPORT

CROSS-REFERENCES TO RELATED APPLICATIONS

This application claims priority to Swedish Patent Application No. 2150416-2, filed Mar. 31, 2021; the content of which are hereby incorporated by reference.

TECHNICAL FIELD

The following disclosure relates to the field of digital imaging and processing and more specifically to the foveated rendering of images and foveated transport of images across a network.

BACKGROUND OF THE INVENTION

It is known in the field of digital image rendering and transmission that where an image is observed by a viewer, processing efficiencies may be obtained by dividing a full-resolution image into a foveal area and a peripheral area. Thus, this process results in reducing the image transmission bandwidth and time requirements and shortens the latency from the viewer's eye moving to presenting an updated image to the viewer. In what is called foveated transport, the peripheral area data of an image is compressed or reduced in resolution, thereby reducing the image data size. This image is then transmitted to the client and displayed to the viewer. Further discussion of foveated transport may be found in U.S. Pat. No. 6,917,715 to Berstis and is incorporated herein in its entirety.

While foveated transport does create processing efficiencies, there remains room for improvement by maximizing efficiency in the compression and imaging filtering processes. Thus, it is desirable to improve the techniques of foveated transport with respect to using the correct amount of filtering and not wasting processing by over filtering. Improved processes can also be made to minimize imaging artifacts from the compression process and minimize visible discontinuities as a viewer's eye moves across a display device.

The present disclosure, therefore, contains improvements to the compression and filtering techniques used in foveated transport that will improve image processing efficiency and image quality.

SUMMARY OF THE INVENTION

According to a first aspect of the invention there is provided a system for providing images in an image transmission system comprising an image source server and an image display client, the image source server having a full-resolution image data set, and the image display client having a user display, the method comprising the steps of:
  determining a viewer's point of interest in a display device by the client;
  separating the full-resolution image data set into a full-resolution foveal section data set and a full-resolution peripheral section data set by the server by:
    determining the position of the foveal point on the display device and the full-resolution foveal section data set, using the point of interest,
  calculating along at least one axis of the full-resolution image data set, the distance from the foveal point to edges of full-resolution image data set,
    calculating the distance from each edge of the full resolution data set to the closest point on a foveal region surrounding the foveal point, and
    determining the full-resolution peripheral section data set which is made up of adjacent peripheral regions from the full resolution data set;
  compressing the full-resolution peripheral data set by reducing the resolution of the image it represents by:
    calculating the distribution of available space in the adjacent peripheral regions of the image using a compression parameter,
    calculating a compression curve wherein the compression of both adjacent peripheral regions is such that neither side of the adjacent peripheral regions are compressed more than the other, mapping the compressed image to the uncompressed image using a mapping function,
    filtering, using the compression curve and its derivative, the full-resolution peripheral data set using a gaussian filter so to remove potential visual artifacts which can occur due to the compression of the image;
  transmitting the full-resolution foveal section data set and the reduced resolution peripheral data set to the client; and
  displaying an image to a user by the client comprising a full-resolution foveal area at the current eye position surrounded by a reduced resolution peripheral area according to the transmitted data sets.

According to a second embodiment of the invention the system the distance from the foveal point to edges of full-resolution image data set is calculated along two or more axes of the full-resolution image data set.

According to a third embodiment of the invention the length of foveal region is inputted as a parameter.

According to a fourth embodiment of the invention if the foveal point is closer to edge of image than half of the length of the foveal region, then the foveal point is adjusted so that the foveal point is half of the length of the foveal region away from the edge of the image.

According to a fifth embodiment of the invention the calculating the distribution of available space in the adjacent peripheral regions of the image comprises calculating the length of output image by dividing the full resolution data set size by the square root of a compression level, wherein compression level is inputted as parameter, and subtracting the length of the foveal region from the total length of the output image to obtain the available space to compress the peripheral area into.

According to a sixth embodiment of the invention, the mapping function comprises mapping the center of a discrete pixel of the compressed image to a point on the uncompressed image, and wherein the mapping function has a calculable derivative which describes for any point on the output image, one or several points on the original image to which it has been compressed from.

According to a seventh embodiment of the invention the mapping function has a calculable derivative which describes for any point on the output image, one or several points on the original image to which it has been compressed from.

According to an eighth embodiment of the invention the kernel size is controlled by the derivative of the compression curve.

According to a ninth embodiment of the invention the system comprises filtering, using a gaussian filter applied by using a kernel size determined by the derivative of the mapping function to further reduce visual artifacts caused by compression.

According to a tenth embodiment of the invention the step of determining a viewer's point of interest in a display device comprises providing an eye movement tracking system associated with the image display client.

BRIEF DESCRIPTION OF THE DRAWINGS

The following detailed description when taken in conjunction with the figures presented herein provide a complete disclosure of the invention.

DETAILED DESCRIPTION OF THE INVENTION

Foveated rendering and foveated transport allows for improved rendering performance by reducing the resolution of the parts of an image that are in the peripheral region of a viewer's vision. Thus, the viewer will not notice the degraded resolution within their peripheral vision. The reduction of resolution is performed through compression and filtering algorithms which "throw away" unneeded resolution, such as by simply not transmitting every other sample value for a 50% reduction in acuity.

In one embodiment, for a given original full resolution image to compress, the system will first, determine position of the foveal point on the display of the device 100. Foveal point detection may be performed by an eye tracking system associated with the image display client, which is well known and will not be discussed further herein. After the foveal point 210 on the display 200 is determined the system will begin the process of separating the full-resolution image into a foveal section to be left unaltered and the peripheral section which is to be compressed. In one embodiment, this separation process is executed for the X and Y axes of the image separately.

Figure 1:
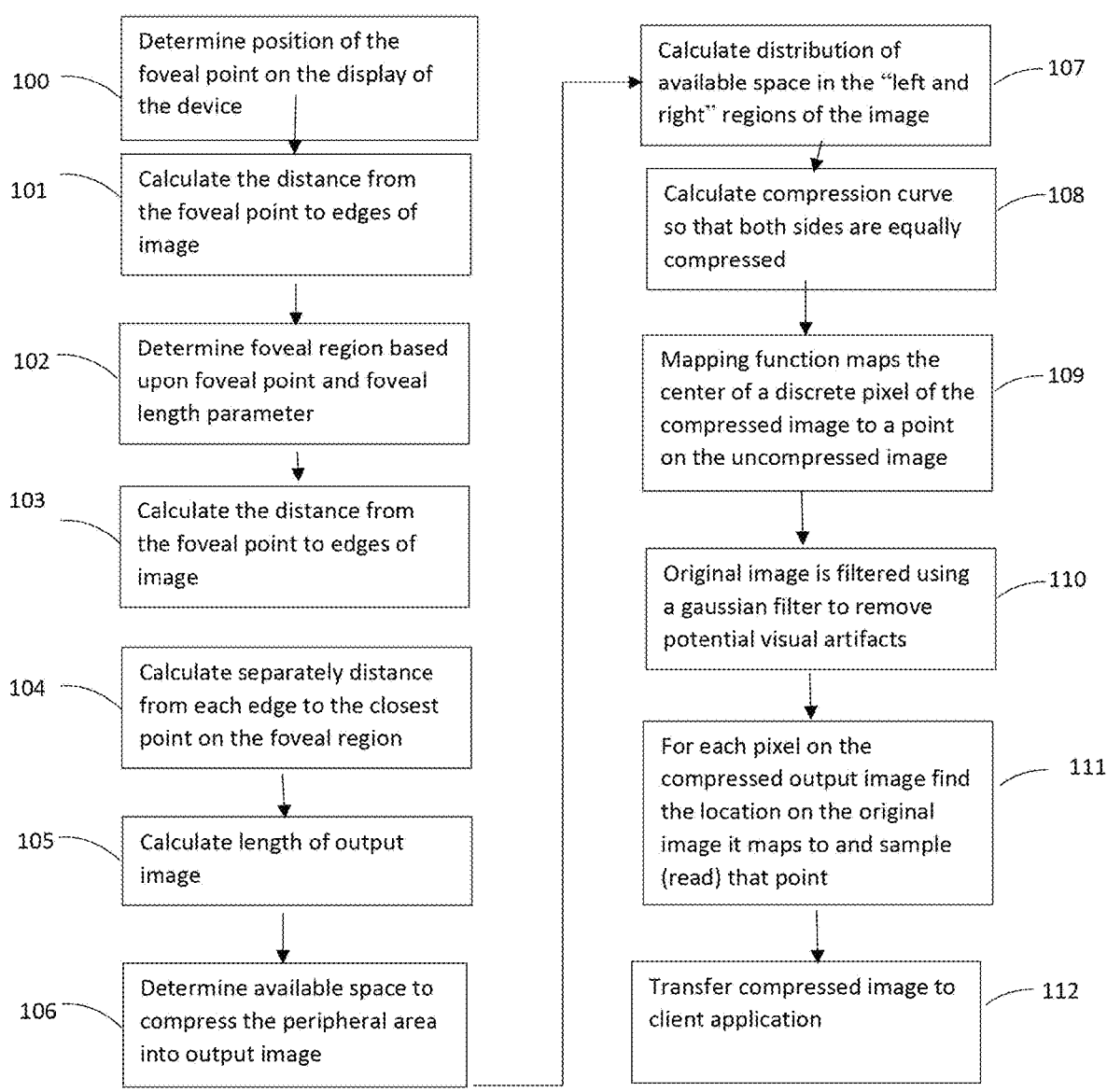
FIG. 1 illustrates the arrangement of system steps according to the preferred embodiment.
Figure 2:
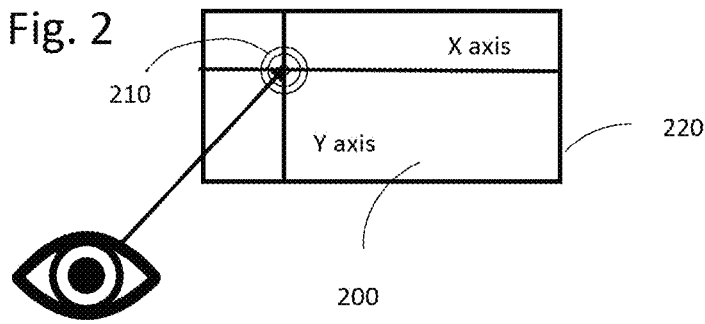
FIG. 2 depicts a diagram of a foveal point on a display.
Figure 3:
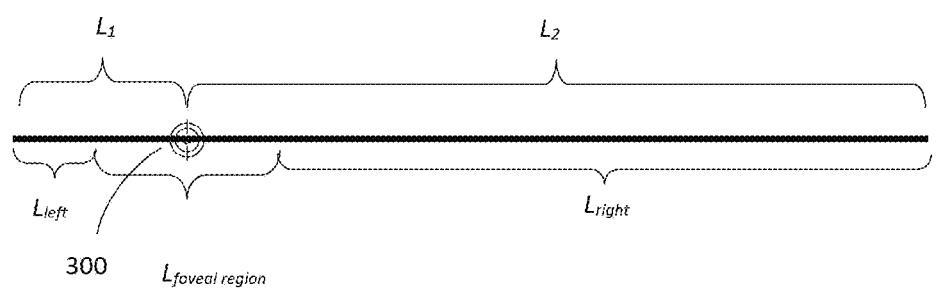
FIG. 3 depicts a graph of a foveal region and adjacent peripheral regions along one axis.

The separation of the foveal section from the peripheral section may be performed by first calculating 101 the distance from the foveal point 210 to the edges of the image 220. In FIG. 3 that distance is depicted as $L_{left}$ and $L_{right}$ respectively. A foveal region $L_{foveal\ region}$ is then defined as a given length surrounding the foveal point 300. The length of the foveal region may be inputted as a parameter. If the foveal point is closer to the edge of the image than half of the length of the foveal region, the foveal point is adjusted so that the foveal point is half of the length away from the edge of the image. The distance from each edge of the image to the nearest point of the foveal region is then calculated 103.

The length of the output image is then determined by dividing the original image size by a function of the inputted compression level 105. The compression level is an inputted parameter of the system and in one embodiment the function of the compression level is a square root. The length of the foveal region is then subtracted from total length of the output image to get the available space to compress the peripheral area into 106. The distribution of available space in the regions adjacent to the foveal region is determined using the compression parameters 107.

Figure 7:
FIG. 7 depicts an original image before compression.
Figure 8:
FIG. 8 depicts the transferred image which has image been reconstructed from compressed.

The compression curve is then calculated in such a way that no matter the distribution, the visual distribution of both sides adjacent to the foveal region is similar i.e. not compressed more on either the smaller or larger side 108. This effect can be seen in FIG. 8, where the foveal region is unaltered and the peripheral region has been compressed as compared with the unaltered full image in FIG. 7.

Figure 4:
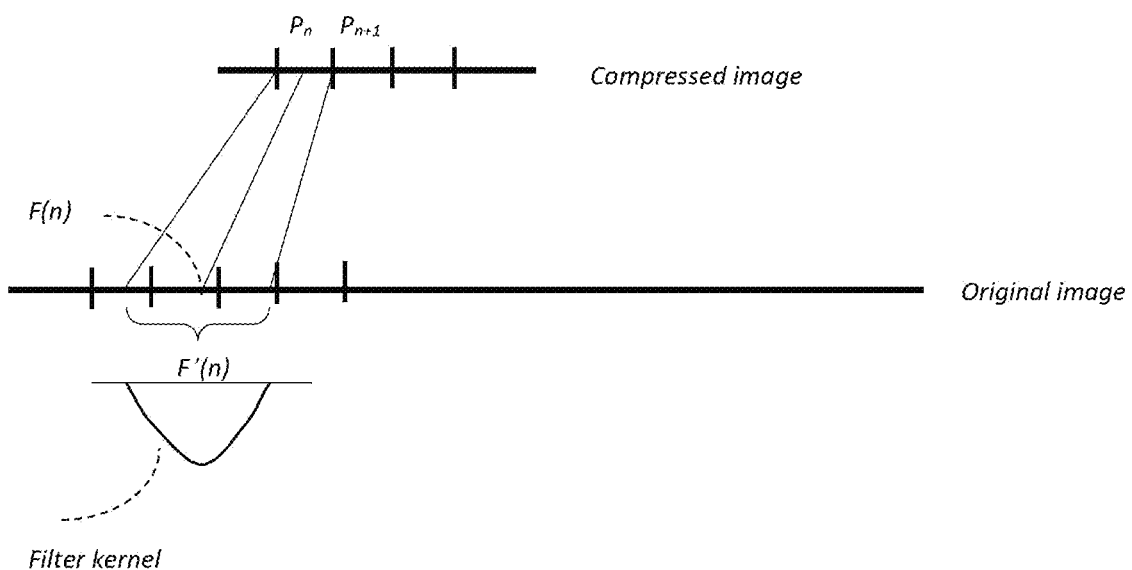
FIG. 4 depicts a graph of mapping functions of compressed to original image.

In an embodiment, a mapping function then maps the center of a discrete pixel of the compressed image to a point on the uncompressed image which may or may not be centered on a pixel 109. The mapping function may have a calculable derivative which describes for any point on the output image, one or several points on the original image to which it has been compressed from, as shown in FIG. 4.

Figure 5:
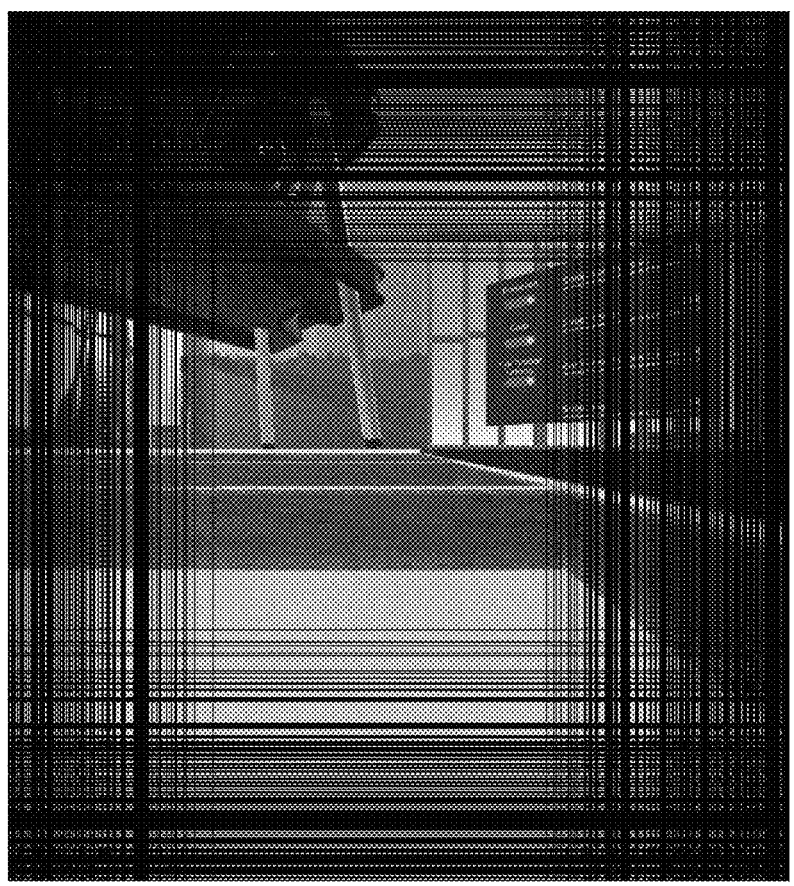
FIG. 5 depict a compressed image where points which will not be filtered have been removed.

Using the compression curve and its derivative, the original image is then filtered using a gaussian filter where the kernel size is controlled by the derivative 110. This step is done to remove potential visual artifacts which can occur due to the compression of the image. Furthermore, this step only outputs the pixels that will be used in the compression step to create the output image. As shown in FIG. 5, the compressed peripheral region has "thrown away" image data, represented by the black lines 500, showing that the filtering step does not need filter the missing data.

Figure 6:
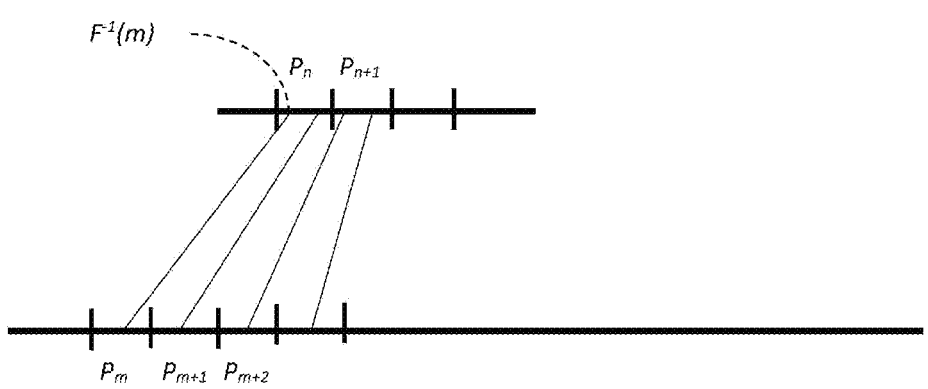
FIG. 6 is a graph of an inverse mapping function.

For each pixel on the compressed output image, the system will find the location on the original image it maps to and sample that point 11. In the general case it will mean interpolation between 4 neighboring pixels. This can be seen in FIG. 6. Thereafter, the compressed image is transferred to the client application 112. The original image may be reconstructed from the compressed one using an inverse mapping function. In one embodiment, further gaussian filtering may be applied using a kernel size dictated by the derivative of the mapping function. This may be used as a final step to further reduce visual artifacts caused by compression.

Persons having skill in the art will recognize that there are multiple advantages to the methods and techniques described herein, including but not limited to the following.

Using a separable function in the system: The use of separable functions allows the system to significantly optimize the processing of the required filtering. Furthermore, the separable function allows the system to produce rectangular images with guaranteed dimensions which can then be video compressed.

Scaling the filter kernel by the size of the derivative of the re-mapping curve: This guarantees that the system uses exactly the correct amount of filtering at every point. As a result, no artifacts are left before video compression and the system does not waste processing on over filtering The system uses a re-mapping curve which has a derivative of one at a minima of a curve function which guarantees the smoothest possible falloff in the image quality, and minimizing visible discontinuities as the eye moves. Furthermore, the system uses a re-mapping curve based on a tangent function, which allows the system to account for the tangential placement of the displays and tangential falloff in visual acuity. This characteristic is particularly suited to gaze tracking applications in VR/AR, in head mounted display devices (HMDs) or large screen displays.

While details of a preferred embodiment have been disclosed accompanied by illustrative examples, it will be recognized by those skilled in the art that certain alternate embodiments may be realized without departing from the spirit and scope of the invention, including but not limited to use of alternate computing platforms and programming methodologies, incorporation of other eye movement tracking technologies or systems, and use of other computer networks and imaging devices. Therefore, the scope of the present invention should be determined by the following claims.

The invention claimed is:

1. A method for providing images in an image transmission system comprising an image source server and an image display client, the image source server having a full-resolution image data set, and the image display client having a user display, the method comprising:
  determining a viewer's point of interest in a display device by the client;
  separating the full-resolution image data set into a full-resolution foveal section data set and a full-resolution peripheral section data set by the server by:
    determining position of a foveal point on the display device and a full-resolution foveal section data set, using a point of interest,
    calculating along at least one axis of the full-resolution image data set, a distance from the foveal point to edges of full-resolution image data set,
    calculating a distance from each edge of the full resolution data set to a foveal region surrounding the foveal point, and determining the full-resolution peripheral section data set which is made up of adjacent peripheral regions from the full resolution data set;
  compressing the full-resolution peripheral data set to create a reduced resolution peripheral data set by reducing resolution of an image it represents by:
    calculating a distribution of available space in the adjacent peripheral regions of the image represented by the full-resolution peripheral data set using a compression parameter,
    calculating a compression curve wherein compression of both adjacent peripheral regions is such that neither side of the adjacent peripheral regions are compressed more than the other, for a compression of the image,
    mapping the image when thus compressed to the image when uncompressed using a mapping function,
    filtering, using the compression curve and its derivative, the full-resolution peripheral data set using a gaussian filter so to remove potential visual artifacts occurring due to the compression of the image;
  transmitting the full-resolution foveal section data set and the reduced resolution peripheral data set to the client; and
  displaying the image to a user by the client comprising a full-resolution foveal area at a current eye position surrounded by a reduced resolution peripheral area according to the transmitted data sets.

2. The method of claim 1, wherein the distance from the foveal point to edges of full-resolution image data set is calculated along two or more axes of the full-resolution image data set.

3. The method of claim 1, wherein a length of foveal region is inputted as a parameter.

4. The method of claim 1, wherein based on a calculation that the foveal point is closer to an edge of image than half of the length of the foveal region, then the foveal point is adjusted so that the foveal point is half of the length of the foveal region away from the edge of the image.

5. The method of claim 1, wherein the calculating a distribution of available space in the adjacent peripheral regions of the image comprises calculating a length of output image by dividing the full resolution data set size by a function of a compression level, wherein compression level is inputted as parameter, and subtracting the length of the foveal region from the length of the output image to obtain the available space to compress the peripheral area into.

6. The method of claim 5, wherein the length of output image is calculated by dividing the full resolution data set divided by the square root of compression level.

7. The method of claim 5, wherein the mapping function comprises mapping a center of a discrete pixel of the compressed image to a point on the uncompressed image, and wherein the mapping function has a calculable derivative which describes for any point on the output image, one or several points on an original image to which it has been compressed from.

8. The method of claim 5, wherein the mapping function has a calculable derivative which describes for any point on the output image, one or several points on an original image to which it has been compressed from.

9. The method of claim 1, wherein a kernel size is controlled by the derivative of the compression curve.

10. The method of claim 1 further comprising filtering, using a gaussian filter applied by using a kernel size determined by a derivative of the mapping function to further reduce visual artifacts caused by compression.

11. The method of claim 1 wherein a step of determining a viewer's point of interest in a display device comprises providing an eye movement tracking system associated with the image display client.

12. The method of claim 1, wherein the display device is a HMD.

13. A non-transitory computer readable medium encoded with software for providing images in an image transmission system comprising an image source server and an image display client, the image source server having a full-resolution image data set, and the image display client having a user display, the software causing the server and client to perform steps of:
  determining a viewer's point of interest in a display device by the client;
  separating a full-resolution image data set into a full-resolution foveal section data set and a full-resolution peripheral section data set by the server by:
    determining position of a foveal point on the display device and a full-resolution foveal section data set, using a point of interest,
    calculating along at least one axis of the full-resolution image data set, a distance from the foveal point to edges of full-resolution image data set,
    calculating a distance from each edge of the full resolution data set to a foveal region surrounding the foveal point, and determining the full-resolution peripheral section data set which is made up of adjacent peripheral regions from the full resolution data set;
  compressing the full-resolution peripheral data set to create a reduced resolution peripheral data set by reducing resolution of an image it represents by:
    calculating a distribution of available space in the adjacent peripheral regions of the image represented by the full-resolution peripheral data set using a compression parameter, calculating a compression curve wherein compression of both adjacent peripheral regions is such that neither side of the adjacent peripheral regions are compressed more than the other, for a compression of the image, mapping the image when thus compressed to the image when uncompressed using a mapping function, filtering, using the compression curve and its derivative, the full-resolution peripheral data set using a gaussian filter so to remove potential visual artifacts occurring due to the compression of the image;

transmitting the full-resolution foveal section data set and the reduced resolution peripheral data set to the client; and displaying the image to a user by the client comprising a full-resolution foveal area at a current eye position surrounded by a reduced resolution peripheral area according to the transmitted data sets.

14. The non-transitory computer readable medium of claim 13, wherein the distance from the foveal point to edges of full-resolution image data set is calculated along two or more axes of the full-resolution image data set.

15. The non-transitory computer readable medium of claim 13, wherein a length of foveal region is inputted as a parameter.

16. The non-transitory computer readable medium of claim 13, wherein based on the calculation that the foveal point is closer to the edge of image than half of the length of the foveal region, then the foveal point is adjusted so that the foveal point is half of the length of the foveal region away from the edge of the image.

17. The non-transitory computer readable medium of claim 13, wherein the calculating a distribution of available space in the adjacent peripheral regions of the image comprises calculating a length of output image by dividing the full resolution data set size by a function of a compression level, wherein compression level is inputted as parameter, and subtracting the length of the foveal region from the length of the output image to obtain the available space to compress the peripheral area into.

18. The non-transitory computer readable medium of claim 17, wherein the length of output image is calculated by dividing the full resolution data set divided by the square root of compression level.

19. The non-transitory computer readable medium of claim 17, wherein the mapping function comprises mapping a center of a discrete pixel of the compressed image to a point on the uncompressed image, and wherein the mapping function has a calculable derivative which describes for any point on the output image, one or several points on an original image to which it has been compressed from.

20. A system for remote viewing of images, the system comprising:

a local means for determining a viewer's point of interest on a display device;

a remote full-resolution image data set separator for dividing a remote full-resolution image into a full-resolution foveal section data set and a full-resolution peripheral section data set by a server by:

determining position of a foveal point on the display device and a full-resolution foveal section data set, using a point of interest, calculating along at least one axis of the full-resolution image data set, a distance from the foveal point to edges of full-resolution image data set, calculating a distance from each edge of the full resolution data set to a foveal region surrounding the foveal point, and determining the full-resolution peripheral section data set which is made up of adjacent peripheral regions from the full resolution data set;

a compressor for reducing resolution of an image represented by the full-resolution peripheral data set to create a reduced resolution peripheral data set by:

calculating a distribution of available space in the adjacent peripheral regions of the image using a compression parameter, calculating a compression curve wherein compression of both adjacent peripheral regions is such that neither side of the adjacent peripheral regions are compressed more than the other, for a compression of the image, mapping the image when thus compressed to the image when uncompressed using a mapping function, filtering, using the compression curve and its derivative, the full-resolution peripheral data set using a gaussian filter so to remove potential visual artifacts occurring due to the compression of the image;

a transmission network for receiving the full-resolution foveal section data set and the reduced resolution peripheral data set to local client; and a local client image renderer for displaying the image to a user comprising a full-resolution foveal area at a current eye position surrounded by a reduced resolution peripheral area according to the transmitted data sets.

\* \* \* \* \*